US007859726B2

(12) United States Patent
Endo et al.

(10) Patent No.: US 7,859,726 B2
(45) **Date of Patent: *Dec. 28, 2010**

(54) IMAGE READING APPARATUS

(75) Inventors: Takafumi Endo, Tokyo (JP); Shigeru Toyota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1218 days.

This patent is subject to a terminal disclaimer.

(21) Appl. No.: 11/427,130

(22) Filed: Jun. 28, 2006

(65) Prior Publication Data

US 2007/0165286 A1 Jul. 19, 2007

(30) Foreign Application Priority Data

Jan. 18, 2006 (JP) ............................ 2006-009710

(51) Int. Cl.
*H04N 1/04* (2006.01)

(52) U.S. Cl. ....................... 358/474; 358/496; 358/498; 358/475; 358/509; 358/487; 382/274; 382/275

(58) Field of Classification Search ................. 358/474, 358/496, 486, 475, 509, 505, 482, 513, 487; 382/274, 275, 137, 139, 140; 250/208.1
See application file for complete search history.

(56) References Cited

U.S. PATENT DOCUMENTS 3,412,993 A * 11/1968 Giori ......................... 270/1.02
4,723,072 A * 2/1988 Naruse ........................ 235/454
4,737,649 A * 4/1988 Naruse .................. 250/559.11
5,475,509 A * 12/1995 Okamoto .................... 358/518
5,489,992 A * 2/1996 Endo .......................... 358/482
5,576,825 A 11/1996 Nakajima et al.
6,876,471 B1 * 4/2005 Konno ........................ 358/500
6,969,838 B2 * 11/2005 Endo et al. ............... 250/208.1
7,423,784 B2 * 9/2008 Tanabe et al. ............... 358/461
2003/0031342 A1 2/2003 Sperl et al.
2005/0200917 A1 * 9/2005 Kanesaka et al. ........... 358/486
2006/0115138 A1 * 6/2006 Klock et al. ................ 382/135
2007/0133858 A1 * 6/2007 Endo et al. .................. 382/137

(Continued)

FOREIGN PATENT DOCUMENTS

EP 0 537 513 A1 4/1993

(Continued)

OTHER PUBLICATIONS

U.S. Appl. No. 12/466,761, filed May 15, 2009, Endo, et al.

(Continued)

*Primary Examiner*—Negussie Worku
(74) *Attorney, Agent, or Firm*—Oblon, Spivak, McClelland, Maier & Neustadt, L.L.P.

(57) ABSTRACT

An image reading apparatus includes: a transporting unit that transports an irradiated member having a light transmissive portion including irregularities; a light source that emits light, which irradiates the irradiated member, and the light source is placed on a one side with respect to the irradiated member and inclined by a predetermined angle with respect to a vertical plane that is perpendicular to the irradiated member; a lens that is placed on an another side with respect to the irradiated member and converges scattered light that is scattered by the irregularities; and a sensor that receives the scattered light converged by the lens.

12 Claims, 10 Drawing Sheets

U.S. PATENT DOCUMENTS

2008/0204842 A1 * 8/2008 Arai et al. .................. 359/204

FOREIGN PATENT DOCUMENTS

| | | | |
|---|---|---|---|
| EP | 1 429 296 | A1 | 6/2004 |
| EP | 1 439 500 | A1 | 7/2004 |
| JP | 62-164192 | | 7/1987 |
| JP | 11-316868 | | 11/1999 |
| JP | 2000-113269 | | 4/2000 |
| JP | 2002-230618 | | 8/2002 |
| JP | 2003-87564 | | 3/2003 |
| JP | 2005-198106 | | 7/2005 |
| WO | WO 2004/066207 | A1 | 8/2004 |

OTHER PUBLICATIONS

U.S. Appl. No. 12/466,808, filed May 15, 2009, Endo, et al.
U.S. Appl. No. 12/191,006, filed Aug. 13, 2008, Endo, et al.
U.S. Appl. No. 11/467,399, filed Aug. 25, 2006, Endo, et al.

* cited by examiner

FIG. 8A
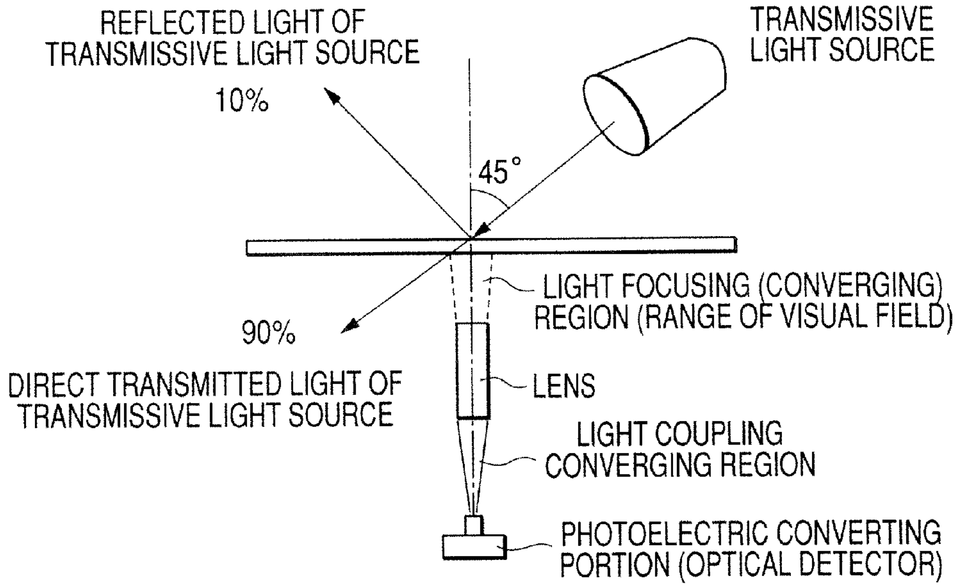
FIG. 8B
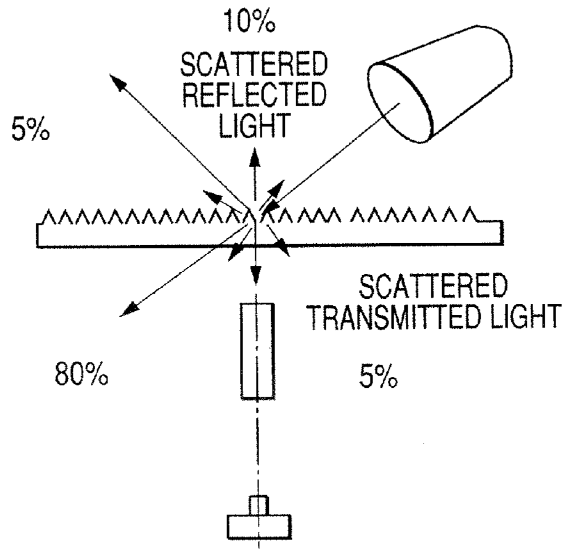
FIG. 8C
| MATERIAL | REFLECTED LIGHT | DIRECT TRANSMITTED LIGHT | SCATTERED TRANSMITTED LIGHT (DETECTION AMOUNT) |
|---|---|---|---|
| TRANSPARENT FILM | 5 TO 10% | 90 TO 95% | 0% |
| CLOUDY FILM | 40 TO 60% | ABOUT 40% | 5 TO 15% |
| WATERMARK (BILL) | 40 TO 70% | 20 TO 30% | 2 TO 5% |

FIG. 10A

BLACK WATERMARK

IMAGE OF MAIN SCANNING DIRECTION

WATERMARK REGION

| POSITION (mm) | | 0.25 | | 0.5 | | 1 | | 1.5 | | 2 |
|---|---|---|---|---|---|---|---|---|---|---|
| 0.5 | 5 | 5 | 5 | 5 | 5 | 5 | 5 | 5 | 5 | 5 |
| 1 | 10 | 10 | 10 | 10 | 5 | 10 | 5 | 10 | 10 | 10 |
| 1.5 | 45 | 40 | 40 | 40 | 30 | 30 | 30 | 30 | 40 | 45 |
| 2 | 80 | 80 | 80 | 85 | 85 | 80 | 80 | 85 | 85 | 85 |
| 2.5 | 85 | 85 | 80 | 90 | 85 | 80 | 80 | 80 | 85 | 85 |
| 3 | 85 | 85 | 85 | 85 | 85 | 80 | 80 | 85 | 85 | 85 |
| 3.5 | 85 | 85 | 85 | 85 | 80 | 85 | 85 | 80 | 80 | 80 |
| 4 | 80 | 80 | 80 | 80 | 80 | 75 | 80 | 70 | 75 | 75 |
| 4.5 | 85 | 80 | 80 | 80 | 80 | 75 | 75 | 65 | 75 | 70 |
| 5 | 75 | 75 | 75 | 75 | 70 | 70 | 65 | 65 | 65 | 70 |
| 5.5 | 80 | 80 | 85 | 80 | 75 | 70 | 60 | 50 | 55 | 65 |
| 6 | 75 | 80 | 80 | 80 | 75 | 70 | 60 | 55 | 55 | 65 |
| 6.5 | 80 | 85 | 80 | 80 | 70 | 65 | 60 | 55 | 55 | 65 |
| 7 | 80 | 80 | 80 | 80 | 75 | 70 | 65 | 40 | 50 | 70 |
| 7.5 | 85 | 85 | 80 | 75 | 75 | 70 | 60 | 45 | 60 | 70 |
| 8 | 90 | 85 | 85 | 85 | 85 | 75 | 60 | 50 | 65 | 70 |
| 8.5 | 90 | 85 | 85 | 80 | 80 | 75 | 70 | 75 | 70 | 75 |
| 9 | 85 | 85 | 85 | 80 | 80 | 75 | 70 | 75 | 75 | 75 |
| 10 | 85 | 80 | 80 | 80 | 85 | 80 | 75 | 75 | 80 | 85 |
| 10.5 | 80 | 80 | 80 | 85 | 80 | 80 | 80 | 80 | 80 | 85 |
| 11 | 85 | 80 | 85 | 85 | 80 | 80 | 80 | 85 | 85 | 80 |
| 11.5 | 45 | 40 | 30 | 30 | 45 | 45 | 45 | 50 | 40 | 40 |
| 12 | 10 | 10 | 10 | 5 | 10 | 5 | 10 | 5 | 10 | 10 |
| 12.5 | 5 | 5 | 5 | 5 | 5 | 5 | 5 | 5 | 5 | 5 |
| 13 | 5 | 5 | 5 | 5 | 5 | 5 | 5 | 5 | 5 | 5 |
| 13.5 | 5 | 5 | 5 | 5 | 5 | 5 | 5 | 5 | 5 | 5 |
| ... | | | | | | | | | | |
| 80 | | | | | | | | | | |

IMAGE OF TRANSPORT DIRECTION

FIG. 10B

| | | | | |
|---|---|---|---|---|
| 45 | 45 | 35 | 45 | 40 |
| 40 | 35 | 35 | 35 | 40 |
| 40 | 30 | 20 | 25 | 35 |
| 40 | 30 | 25 | 25 | 35 |
| 35 | 30 | 25 | 25 | 35 |
| 40 | 35 | 10 | 20 | 40 |
| 40 | 30 | 15 | 30 | 40 |
| 45 | 30 | 20 | 35 | 40 |
| 45 | 40 | 45 | 40 | 45 |
| 45 | 40 | 45 | 45 | 45 |

ADDITION IS MADE WITH SETTING IMAGE DATA -30 NEAR BLACK WATERMARK AS REFERENCE

| | | |
|---|---|---|
| 40 | 40 | 40 |
| 35 | 25 | 30 |
| 35 | 30 | 30 |
| 35 | 30 | 30 |
| 40 | 15 | 25 |
| 35 | 20 | 35 |
| 35 | 25 | 40 |

RAM2 COLLATION ADDITION DATA +5

↔

| | | |
|---|---|---|
| 30 | 30 | 30 |
| 25 | 25 | 20 |
| 25 | 20 | 20 |
| 25 | 20 | 20 |
| 30 | 5 | 15 |
| 25 | 10 | 25 |
| 25 | 15 | 30 |

RAM2 COLLATION SUBTRACTION DATA -5

IMAGE READING APPARATUS

BACKGROUND OF THE INVENTION

1. Field of the Invention

The present invention relates to an image reading apparatus that reads a light transmissive portion of an irradiated member such as a bill.

2. Description of the Related Art

Conventionally, an image reading apparatus of this kind is disclosed in, for example, JP-A-2000-113269. Namely, JP-A-2000-113269 discloses a paper currency authenticating apparatus in which a watermark pattern of a paper currency or the like is irradiated with light, the transmitted light is detected by an artificial retina chip, and information such as the shape of an image of the transmissive portion (hereinafter, referred to also as watermark portion) and the presence or absence of the image is processed by a knowledge-processing circuit to authenticate the paper currency. By contrast, JP-A-2003-87564 discloses an image reading apparatus in which so-called transmissive and reflective types are combinedly used. The disclosed image reading apparatus is configured so that a light source for a transmissive original is housed in an original cover, an original mat is detachably engaged with the original cover, the original mat is attached to the original cover when a reflective original is to be read, and the original mat is detached from the original cover when a transmissive original is read.

SUMMARY OF THE INVENTION

In the paper currency authenticating apparatus disclosed in JP-A-2000-113269, however, authentication of a watermark portion of a paper currency or the like is conducted by causing so-called direct light from a light source transmitted through the watermark portion of the paper currency, and converting the transmitted light to an electric signal to read an image of the watermark portion of the paper currency.

The image reading apparatus disclosed in JP-A-2003-87564 may be considered as a combination of a so-called transmissive image reading apparatus (hereinafter, often referred to simply as transmissive apparatus) and a so-called reflective image reading apparatus (hereinafter, often referred to simply as reflective apparatus). Also in this case, reading of an image in a light transmissive portion by the transmissive apparatus is conducted with using so-called direct light.

The present invention has been made in view of the above circumstances and provides an image reading apparatus.

According to an aspect of the image reading apparatus, a light source is placed on a one side with respect to an irradiated member, and with being inclined by a predetermined angle with respect to a vertical plane that is perpendicular to the irradiated member, and scattered light that is scattered by irregularities of a light transmissive portion of the irradiated member is received, thereby reading the transmissive portion of the irradiated member.

According to another aspect of the invention, a transmissive light source is placed on a one side with respect to the irradiated member, and with being inclined by a predetermined angle with respect to a vertical plane that is perpendicular to the irradiated member, and scattered light that is scattered by irregularities of a light transmissive portion of the irradiated member is received, and moreover a reflective light source is placed on an another side with respect to the irradiated member, and reflected light that is reflected by a reflective portion of the irradiated member is received, thereby reading the transmissive and reflective portions of the irradiated member.

According to a first aspect of the invention, there is provided a image reading apparatus including: a transporting unit that transports an irradiated member having a light transmissive portion including irregularities; a light source that emits light, which irradiates the irradiated member, wherein the light source is placed on a one side with respect to the irradiated member and inclined by a predetermined angle with respect to a vertical plane that is perpendicular to the irradiated member; a lens that is placed on an another side with respect to the irradiated member and converges scattered light that is scattered by the irregularities; and a sensor that receives the scattered light converged by the lens.

According to a second aspect of the invention, there is provided an image reading apparatus including: a transporting unit that transports an irradiated member having a light transmissive portion including irregularities; a light source that emits light, wherein the light source is placed on a one face side with respect to the irradiated member and inclined by a predetermined angle with respect to a vertical plane that is perpendicular to the irradiated member; a light-guiding member that guides the light emitted from the light source to the irradiated member to irradiate the irradiated member; a lens that is placed on an another side with respect to the irradiated member and converges scattered light that is scattered by the irregularities; and a sensor that receives the scattered light converged by the lens.

According to a third aspect of the invention, there is provided an image reading apparatus including: a transporting unit that transports an irradiated member to a transport direction, wherein the irradiated member having a light transmissive portion including irregularities and a light reflective portion; first and second light sources that emit lights, which irradiate the irradiated member, wherein the first and the second light source being placed on a one side with respect to the irradiated member and inclined respectively in the transport direction and in an opposite transport direction that is opposite to the transport direction by a predetermined angle with respect to a vertical plane that is perpendicular to the irradiated member; a lens that is placed on an another side with respect to the irradiated member and converges scattered light that is scattered by the irregularities; a sensor that receives the scattered light converged by the lens; third and fourth light sources that are placed upstream to the transport direction and downstream to the transport direction with respect to the sensor respectively; and light-guiding members that guide lights emitted from the first and second reflective light sources to irradiate the irradiated member.

The predetermined angle may be within a range from 30 degree to 60 degree.

According to a fourth aspect of the invention, there is provided an image reading apparatus including: a transporting unit that transports an irradiated member to a transport direction, wherein the irradiated member having a light transmissive portion including irregularities; a light source that emits light, which irradiates the irradiated member, wherein the light source being placed on a one side with respect to the irradiated member and inclined by a predetermined angle with respect to a vertical plane that is perpendicular to the irradiated member; a lens that is placed on an another side with respect to the irradiated member and converges scattered light that is scattered by the irregularities; and a sensor that receives the scattered light converged by the lens to output an electric signal; an A/D converter that converts the output signal of the sensor to digital data;

a storage unit that stores reference digital data obtained from a reference irradiated member; and a collating unit that collates the digital data from the A/D converter with the reference digital data stored in the storage unit.

The storage unit may store the digital data from the A/D converter at regular intervals in the transport direction of the irradiated member and a main scanning direction of the irradiated member respectively.

The collating unit may add a predetermined value to the digital data from the A/D converter and collates a result of the addition with the reference digital data stored in the storage unit.

According to the above configuration, it is possible to accomplish an effect that a transmissive portion of the irradiated member can be read by placing a light source on a side of one face of the irradiated member, and with being inclined by a predetermined angle with respect to a vertical plane of the irradiated member, and receiving scattered light that is scattered by irregularities of a light transmissive portion of the irradiated member.

BRIEF DESCRIPTION OF THE DRAWINGS

FIG. 3A is a plan view, and FIG. 3B is a side view.

FIG. 5A is a block diagram of the whole apparatus, and FIG. 5B is a block diagram of a collating circuit.

FIGS. 8A and 8B are diagrams showing transmitted and reflected light of a transmissive light source of the image reading apparatus of Embodiment 1 according to the invention, FIG. 8A shows a case where a transparent sheet is used, FIG. 8B shows a case where a transparent sheet is provided with irregularities, and FIG. 8C is a view illustrating ratios of transmitted light and reflected light in various materials.

FIG. 9 is a diagram illustrating a converged state of scattered light due to a watermark portion of a bill or the like.

FIGS. 10A and 10B are diagrams showing an image digital output of the image reading apparatus of Embodiment 1 according to the invention.

DETAILED DESCRIPTION OF THE INVENTION

Embodiment 1

(Configuration)

Figure 1:
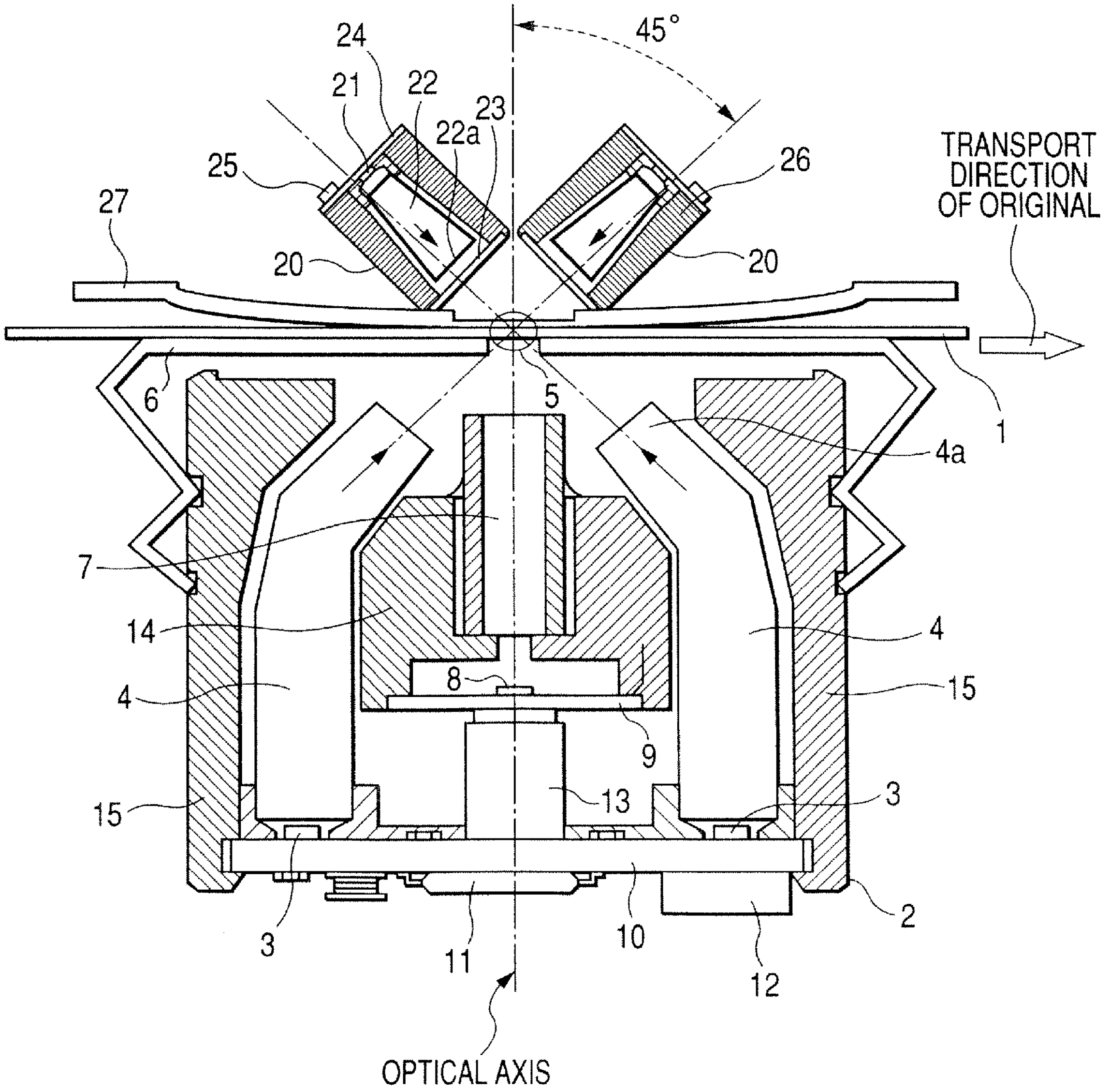
FIG. 1 is a section diagram showing an image reading apparatus of Embodiment 1 according to the invention.

Hereinafter, Embodiment 1 of the invention will be described with reference to FIG. 1. FIG. 1 is a section diagram showing an image reading apparatus of Embodiment 1. In FIG. 1, The reference numeral 1 denotes an irradiated member such as a bill, securities, or a check (hereinafter, referred to simply as "original" or "bill") having a translucent or transparent watermark portion (hereinafter, referred to also as transmissive portion), and a reflective portion through which light is hardly transmitted.

The reference numeral 2 denotes a contact image sensor (hereinafter, abbreviated to "CIS") which is placed on a one side (in FIG. 1, the lower side) with respect to the original 1, and 3 denotes reflective light sources which are placed in the both sides of the CIS 2, and which are placed on a one side with respect to the original 1, and in which LED chips are linearly arranged in an array-like manner over the width direction (the main scanning direction) of the original 1. The reference numeral 4 denotes refractive light-guide members which guide light emitted from the reflective light sources 3 so as to irradiate an irradiation portion 5 of the original 1, and which have a light emission portion 4*a*. The irradiation portion 5 means a linear portion which is in the main scanning direction, and in which the original 1 in a transporting path for the original 1 is irradiated with the light from the reflective light sources 3, or a read portion of the original 1 which is transported The reference numeral 6 denotes a transmissive member which has a function of preventing a foreign material from entering the CIS 2, which is configured by a transparent plastic material, and which has a thickness of about 2.5 mm. The original 1 is transported while being guided outside the transmissive member 6. The reference numeral 7 denotes a rod lens array which converges reflected light generated by reflecting the light emitted from the reflective light sources 3 by the one face of the original 1, and 8 denotes a light receiving portion (sensor) that receives the reflected light converged by the rod lens array 7, and that is configured by a sensor IC into which plural photoelectric converting elements, a driving circuit for the elements, and the like are incorporated. The reference numeral 9 denotes a sensor board on which plural light receiving portions (referred to as sensors or sensor ICs) 8 are mounted, and 10 denotes a board configured by a printed circuit board on which the reflective light sources 3 are mounted in the both sides of the board 10.

The reference numeral 11 denotes a signal processing IC (ASIC) into which a signal processing portion is incorporated, and which outputs image information from the original 1 as an image signal. The signal processing portion includes a correction circuit which, after analog signal that have been photoelectrically converted by the light receiving portions 8 are A/D-converted, performs shading correction and all-bit correction on signal outputs of pixels (bits). The reference numeral 12 denotes a connector supported on the rear side of the board 10 through which input signals for driving the CIS 2, such as a system signal (SCLK), a start signal (SI), and a clock signal (CLK), and an electric power for the light source are supplied, control signals are input and output, and an image signal (SIG) and the like are output to the outside. The reference numeral 13 denotes a relay connector through which signals between the sensor board 9 and the board 10 are transferred, 14 denotes an inner case which houses and holds the rod lens array 7 and the sensor board 9, and 15 denotes an outer case which houses and holds the refractive light-guide members 4, the transmissive member 6, and the board 10. The inner case 14 is held by the relay connector 13, and the transmissive member 6 is fixed to the outer case 15 by disposing notches, etc. As a result, the reflective apparatus is configured by the reflective light sources 3, the rod lens array 7, the light receiving portions 8, etc.

On the other hand, 20 denotes transmissive light source members which emit light over the main scanning direction of the original 1. In each of the transmissive light source members 20, 21 denotes a transmissive light source in which LED chips are linearly arranged in an array-like manner over the main scanning direction, and 22 denotes a trumpet-shaped light-guiding member which guides light emitted from the transmissive light source 21 toward the original 1, which has a light emission portion 22*a*, and which is configured so that light emitted from the light emission portion 22*a* irradiates the irradiation portion 5 in the transporting path for the original 1. The light emitted from the light emission portion 22*a* irradiates an angle of about 45 degree with respect to an optical axis of the rod lens array 7 which is perpendicular to the transport direction of the original 1.

The reference numeral 23 denotes a transparent glass plate through which light is transmitted, 24 denotes an LED board on which the LED chips of the transmissive light source 21 are mounted, 25 denotes a connector which is supported on the LED board 24, and through which an electric power for driving the transmissive light source 21 is supplied, 26 denotes a case which houses and holds the trumpet-shaped light-guiding member 22, the glass plate 23, and the LED board 24, and 27 denotes an upper transportation guide which is configured by a plastic material having a thickness of 2.5 mm. As a result, the transmissive apparatus is configured by the transmissive light sources 21, the rod lens array 7, the light receiving portions 8, etc. In the figure, the same reference numerals denote identical or equivalent components.

Figure 2:
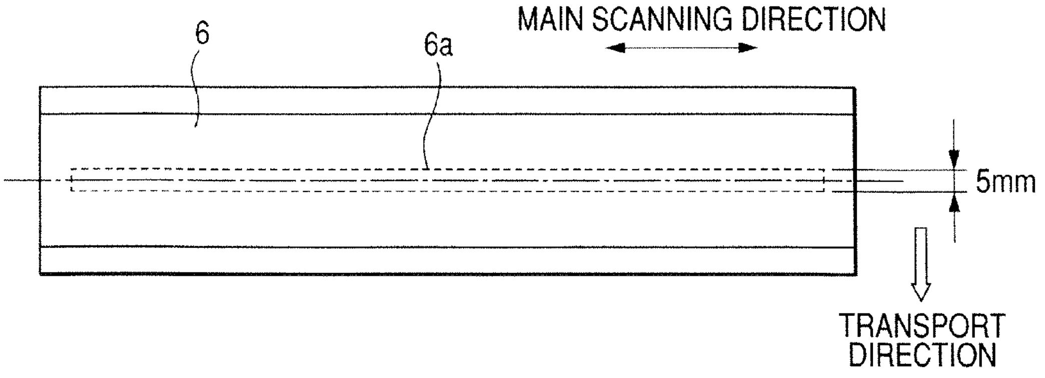
FIG. 2 is a plan view of a transmissive member of the image reading apparatus of Embodiment 1 according to the invention.

FIG. 2 is a plan view of the transmissive member 6, and 6*a* denotes a groove of the transmissive member 6 which is disposed in a converging region of the rod lens array 7. The groove has a constant width with respect to the transport direction of the original 1, and is formed as a cavity which elongates from one end to the other end with respect to the main scanning direction.

Figure 3A:
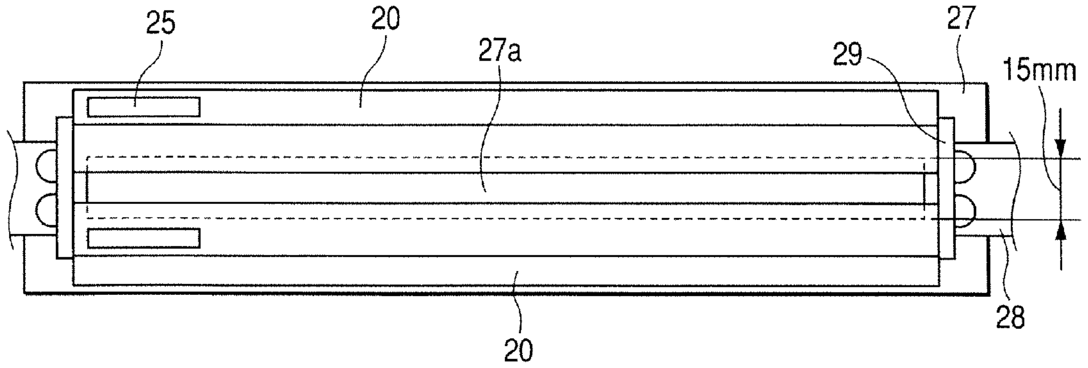
FIGS. 3A and 3B are views showing the configuration of the image reading apparatus of Embodiment 1 according to the invention.
Figure 3B:
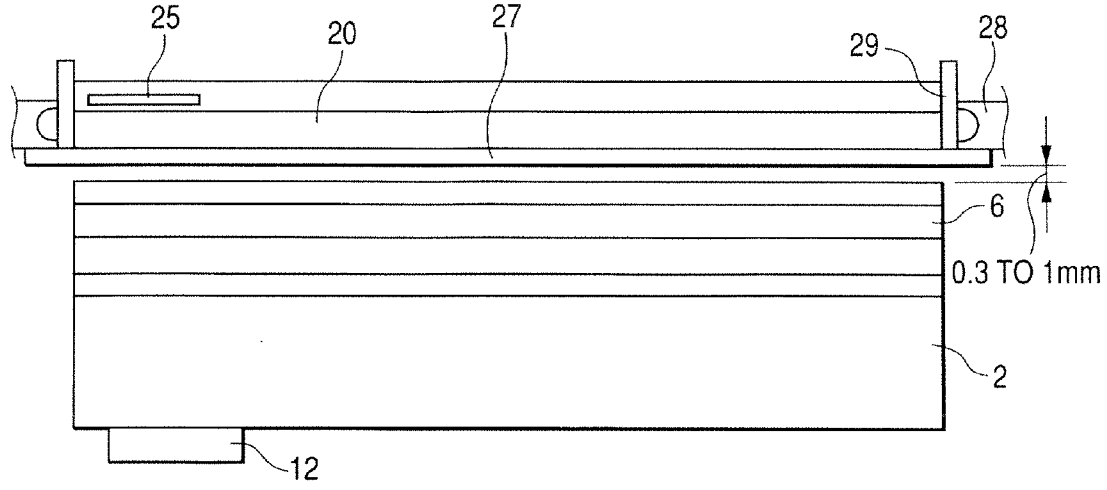

FIGS. 3A and 3B are views showing the configuration of the image reading apparatus of Embodiment 1, FIG. 3A is a plan view of the apparatus, and FIG. 3B is a side view of the apparatus. In FIGS. 3A and 3B, 27*a* denotes a depression of the upper transportation guide 27 which is disposed in the converging region of the rod lens array 7. The depression 27*a* is wide with respect to the transport direction of the original 1, recessed from one end to the other end with respect to the main scanning direction, and integrally formed. The reference numeral 28 denotes stays which support the upper transportation guide 27 and the transmissive light source members 20. The upper transportation guide 27 and the stays 28 are fixed to one another by an elastic adhesive agent, and the transmissive light source members 20 and the stays 28 are screwed to each other via a butting plate 29. The original 1 is transported through a gap between the transmissive member 6 and the upper transportation guide 27. The gap has a size of about 0.3 to 1 mm depending on the position. As more approaching the irradiation portion 5 in the transport direction, the upper transportation guide 27 and the transmissive light sources 21 are further caused to sag by their own weights, and the gap becomes narrower. This configuration is employed because, even when the original 1 wrinkles or bends, the original 1 is smoothed and flattened, whereby the reading accuracy is improved. In the figure, the same reference numerals as those of FIG. 1 denote identical or equivalent components.

Figure 4:
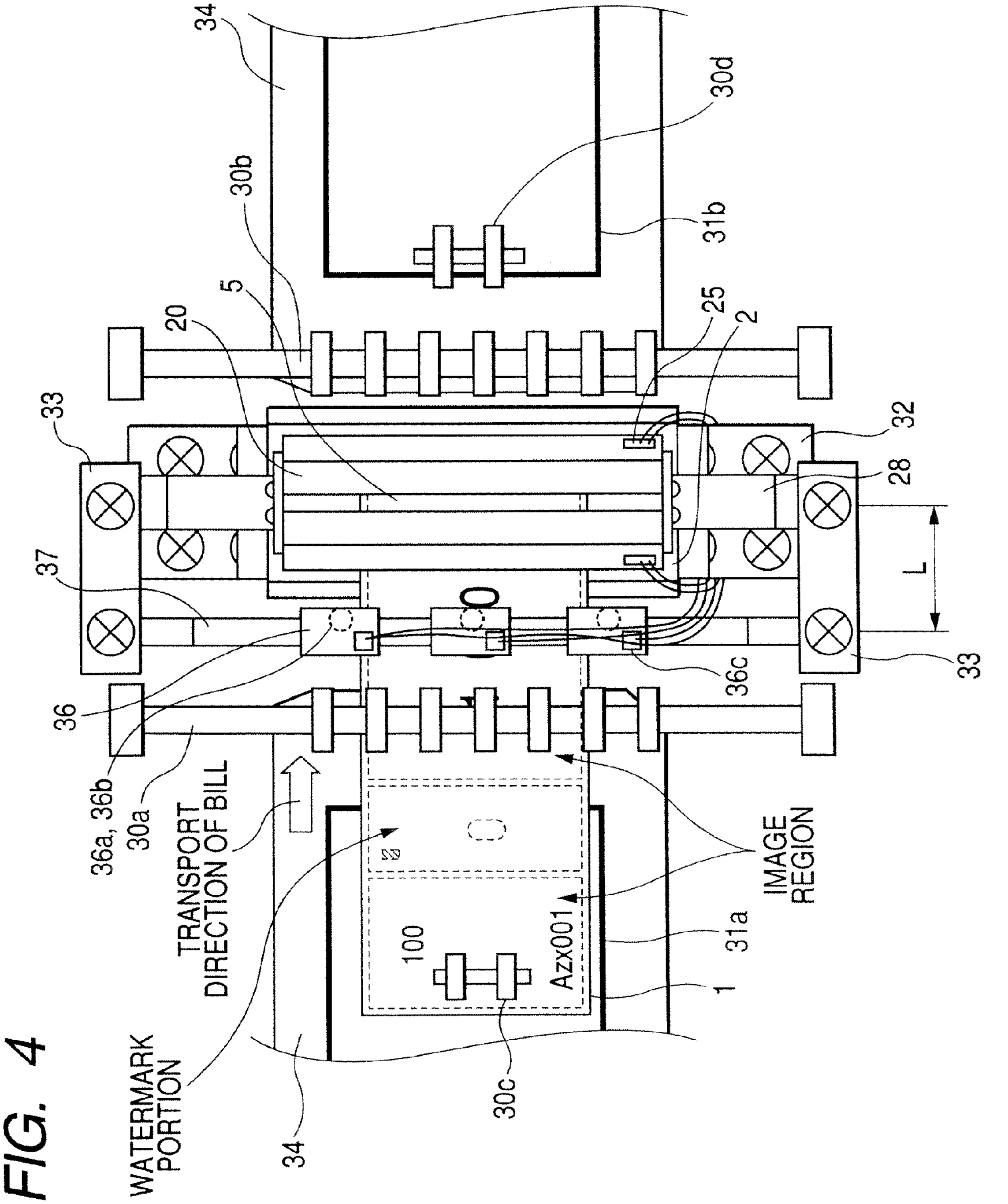
FIG. 4 is a plan view of the image reading apparatus of Embodiment 1 according to the invention including transporting unit.

FIG. 4 is a plan diagram of the image reading apparatus of Embodiment 1 including transporting unit. Namely, 30 denotes transport rollers configured by a sheet feed roller 30*a*, a sheet discharge roller 30*b*, a take-out roller 30*c* for the original 1, and a take-in roller 30*d* for the original 1. The transport rollers 30 are driven by a motor (not shown) on the basis of a predetermined transport signal, to transport the original 1. The reference numeral 31 denotes cassettes which accommodate the original 1, and which have a sheet feed cassette 31*a* and a sheet discharge cassette 31*b*, 32 denotes a pedestal which fixes the CIS 2, 33 denotes a fixing holder which fixes detecting unit configured by a photosensor, the transmissive light source members 20, and the upper transportation guide 27, via the stays 28, and 34 denotes an original table on which the original 1 is to be placed.

The reference numeral 36 denotes the detecting unit (hereinafter, referred to simply as "photosensor") which is configured by a split photosensor having light emitting elements 36*a* and light receiving elements 36*b*, and which elongates from one end of the original 1 to the other end with respect to the main scanning direction of the original 1. A connector 36*c* is disposed in the photosensor 36, and the photosensor 36 is positioned and fixed by fixation holders 33 via a stay 37. The photosensor 36 is disposed with being separated from the irradiation portion 5 by a predetermined distance (for example, L=50 mm) in the direction opposite to the transport direction of the original 1, and configured so that the original 1 is transported between the light emitting elements 36*a* and the light receiving elements 36*b*. In the photosensor 36, light emitted from the light emitting elements 36*a* is reflected by a reflective portion of the original 1 and fails to reach the light receiving elements 36*b*, but is transmitted through a transmissive portion of the original 1 and reaches the light receiving elements 36*b*. At this time, in the photosensor 36, light is received by the light receiving elements 36*b* until the transmissive portion of the original 1 passes over.

In FIG. 4, therefore, the photosensor 36 is fixed to the stay 37. The original 1 placed in an upper portion of the sheet feed cassette 31*a* is sequentially transported to the irradiation portion 5 of a reading region of the CIS 2 by the transport rollers 30*c*, 30*a*. In the transporting path for the original 1, the photosensor 36 for detecting a transmissive portion of the original 1 containing a black watermark, a white watermark, or the like is disposed with being separated from the irradiation portion 5 by the predetermined distance L in the direction opposite to the transport direction. In FIG. 4, three photosensors 36 are disposed at regular intervals in the main scanning direction of the original 1. In the case where, as shown in FIG. 4, the transmissive portion of the original 1 is formed so as to elongate from one end to the other end in the main scanning direction of the original 1, the photosensor 36 may be configured by one photosensor. The bill 1 which has passed through the reading region is accommodated in the cassette 31*b* by the transport rollers 30*b*, 30*d*. The transport rollers 30*a*, 30*b* are synchronously driven so as to transport the original 1 at a speed of, for example, 250 mm/sec. In FIG. 4, the same reference numerals as those of FIGS. 1 and 3 denote identical or equivalent components.

The CIS 2, the transmissive light source members 20, the photosensor 36, and the like are fixed to the body of the image reading apparatus (reading system) of, for example, a financial terminal.

(Turn-on and off of Light Source)

In the image reading apparatus of Embodiment 1, when the reflective light sources 3 are turned on during the period of transporting the reflective portion of the original 1 through the irradiation portion 5, reflected light which is reflected by the reflective portion of the original 1 in the irradiation portion 5 is imaged on the light receiving portions 8 via the rod lens array 7. At this time, the transmissive light sources 21 are turned off. By contrast, when the transmissive light sources 21 are turned on during the period of transporting the transmissive portion of the original 1 through the irradiation portion 5, transmitted light which has been transmitted through the transmissive portion of the original 1 is imaged on the light receiving portions 8 via the rod lens array 7. At this time, the reflective light sources 3 are turned off. In the example, the reflective light sources 3 and the transmissive light sources 21 are turned on and off in this way. Even when the transmissive light sources 21 are turned on during the period of turning on the reflective light sources 3, however, light from the transmissive light sources 21 is reflected by the reflective portion of the original 1 and hardly received by the light receiving portions 8 via the rod lens array 7. In such a case, even when the transmissive light sources 21 are turned on, reading of the reflective portion of the original 1 is hardly affected.

By contrast, when the reflective light sources 3 are turned on during the period of turning on the transmissive light sources 21, light from the reflective light sources 3 is transmitted through the transmissive portion of the original 1. However, part of the light may be possibly reflected by the transmissive portion of the original 1 and then received by the light receiving portions 8, and hence there is a possibility that correct reading in the transmissive portion of the original 1 is affected. In such a case, therefore, it is preferable that the reflective light sources 3 are turned off during a period when the transmissive light sources 21 are turned on.

(Control of Turning on and off of Light Sources)

Figure 5A:
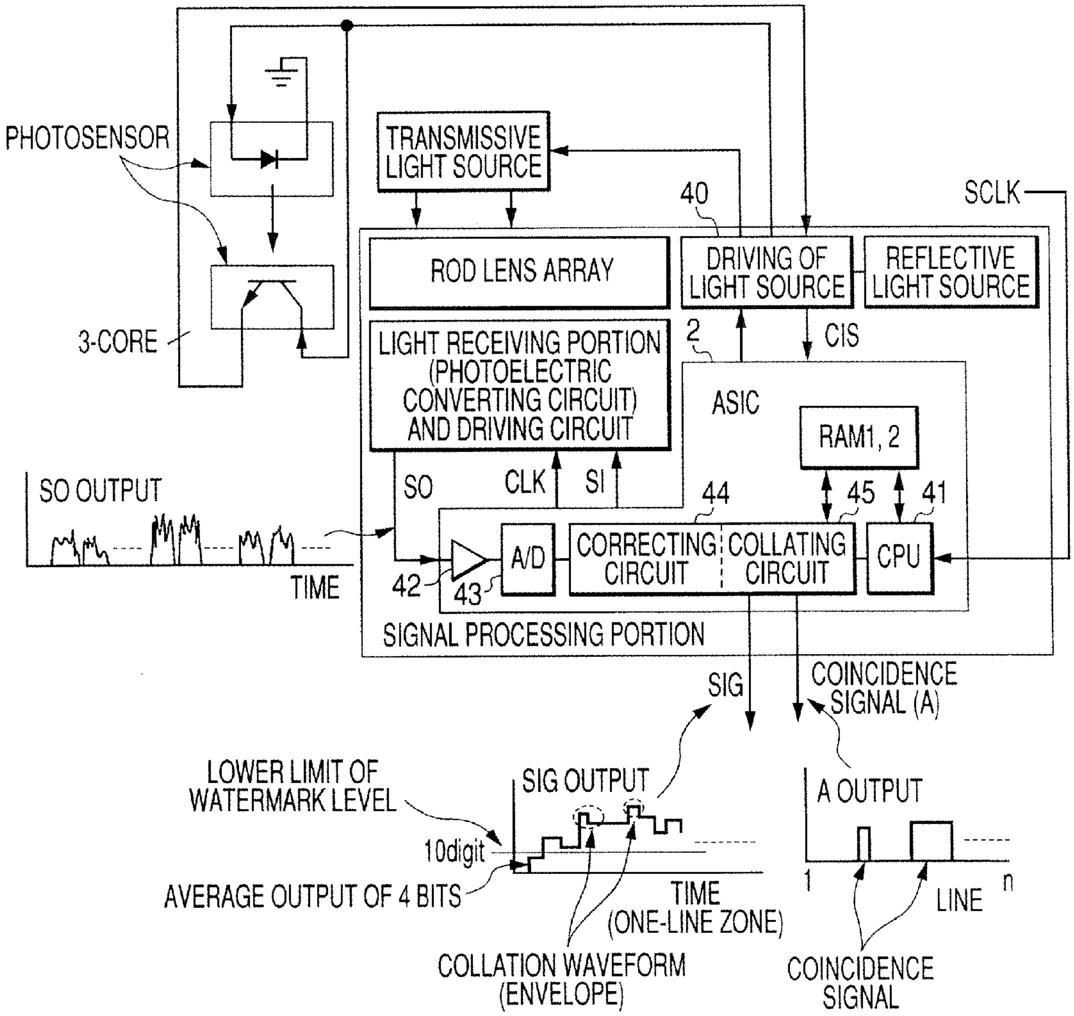
FIGS. 5A and 5B are block diagrams of the image reading apparatus of Embodiment 1 according to the invention.
Figure 5B:
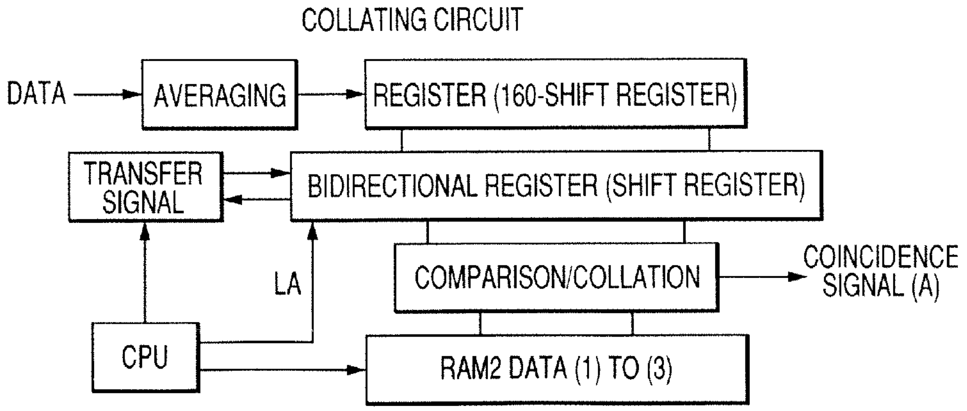

Next, FIGS. 5A and 5B are block diagrams of the image reading apparatus of Embodiment 1. In FIG. 5A, 40 denotes a light driving circuit for turning on and off the reflective light sources 3 and the transmissive light sources 21, and 41 denotes a control unit (CPU) which controls the light driving circuit 40. Namely, a timing signal indicative of the initial detection of the transmissive portion of the original 1 is supplied from the photosensor 36 to the CPU 41. When the speed of transporting the original 1 is constant, the transmissive portion of the original 1 reaches the irradiation portion 5 after elapse of a time period corresponding to the predetermined distance L between the photosensor 36 and the irradiation portion 5. Therefore, the light driving circuit 40 is controlled at that timing so as to turn on the transmissive light sources 21, and turn off the reflective light sources 3. Then, the CPU 41 controls the light driving circuit 40 so as to continue the turning on of the transmissive light sources 21 and the turning off of the reflective light sources 3, only during the period when the transmissive portion of the original 1 is detected by the photosensor 36.

By contrast, during a period when, after the reading system signal (SCLK) is supplied to the CPU 41, the transmissive portion of the original 1 is not detected by the photosensor 36, the CPU 41 assumes that the reflective portion of the original 1 passes over the photosensor 36, and controls the light driving circuit 40 so as to turn on the reflective light sources 3 and turn off the transmissive light sources 21. In this way, the light driving circuit 40 is controlled by the CPU 41 so as to control turning on and off of the reflective light sources 3 and the transmissive light sources 21. The reference numeral 42 denotes a variable amplifier which amplifies an analog signal (SO, also called an analog image output), 43 denotes an A/D (analog/digital) converter which converts the analog signal to a digital signal, 44 denotes a correcting circuit, and 45 denotes a collating circuit.

Figure 6:
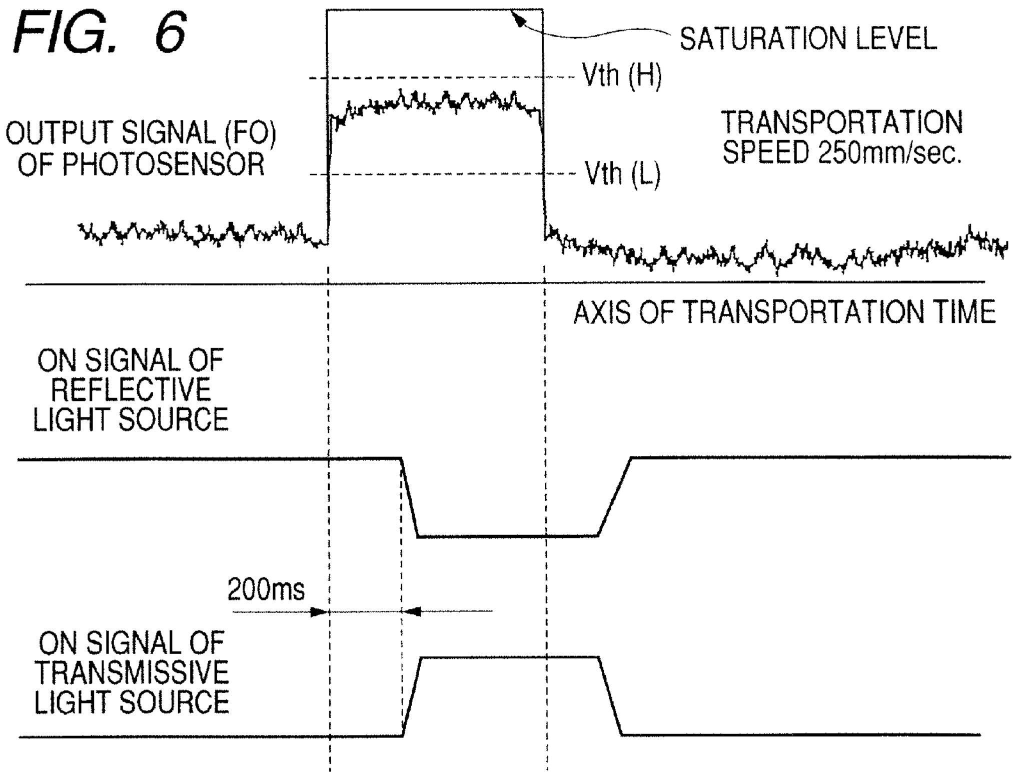
FIG. 6 is a timing chart of a photosensor of the image reading apparatus of Embodiment 1 according to the invention.
Figure 7:
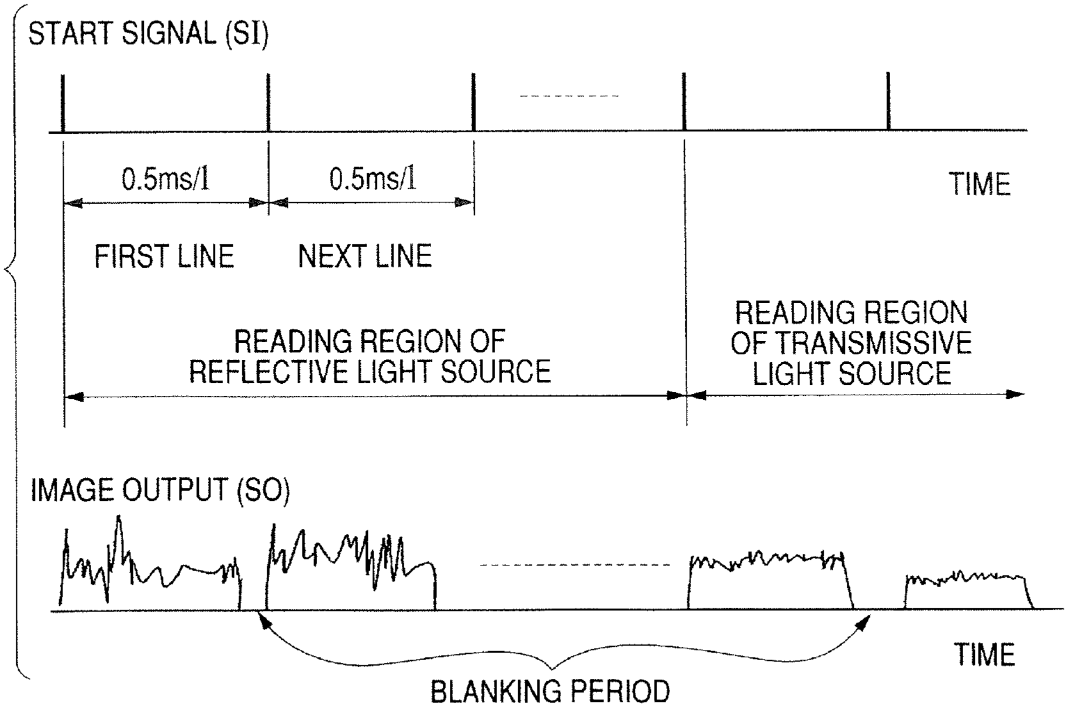
FIG. 7 is a timing chart of an image output of the image reading apparatus of Embodiment 1 according to the invention.

FIG. 6 is a timing chart showing the manner of a change of relationships between an output signal (FO) of the photosensor 36 and lighting signals for the reflective light sources 3 and the transmissive light sources 21, with respect to the time axis. It is assumed that the original 1 is transported at, for example, 250 mm/sec. When the original 1 on the photosensor 36 is a reflective portion, the output signal (FO) of the photosensor 36 is at a low level, and hence the reflective light sources 3 are turned on (ON) and the transmissive light sources 21 are turned off (OFF). By contrast, when the transmissive portion of the original 1 reaches the photosensor 36, the output signal (FO) of the photosensor 36 is at a high level. In this case, after, for example, 200 ms has been elapsed from the timing when the output signal (FO) of the photosensor 36 rises to a predetermined level range, i.e., a range between Vth (L) and Vth (H), the reflective light sources 3 are turned off (OFF) and the transmissive light sources 21 are turned on (ON). This state is continued for a time period which is equal to the time period when the output signal (FO) of the photosensor 36 is between Vth(L) and Vth(H). FIG. 7 shows temporal variations of the image output (SO) in a reflective light source reading region and a transmissive light source reading region. In synchronization with the start signal (SI), the image output (SO) sequentially appears. A blanking period is disposed between line outputs, so that the reading time and the transportation speed can be changed.

(Operation of Block Configuration)

Next, the block diagram of the whole shown in FIG. 5A will be described. First, based on the reading system signal (SCLK), the start signal (SI) of 0.5 ms/Line which is synchronized with the clock signal (CLK) of the CIS 2 is supplied to the light receiving portions 8. At this timing, the analog signal (SO) that is photoelectrically converted by the light receiving portions 8 is output. The signal (SO) is amplified by the variable amplifier 42, and then analog/digital (A/D) converted by the A/D converter 43. The resulting digital signal is supplied to the correcting circuit 44 and the collating circuit 45. The correcting circuit 44 performs the shading correction including sample holding, and the all-bit correction. The correction of digital signal data obtained from the signal (SO) is performed by reading digital data in which preset reference signal data are stored from a RAM1 region, and applying a calculation process with using image information collected from the original 1 and the correcting circuit 44. This is performed in order to uniformalize the photoelectric conversion outputs from the light receiving portions 8 in view of dispersion of the elements of the reflective light sources 3, the rod lens array 7, the light receiving portions 8, an the like constituting the CIS 2.

The configuration of the collating circuit 45 incorporated in the correcting circuit 44 is shown in FIG. 5B. The collating circuit 45 reads out from RAM2 digital data in which an image signal in the transmissive portion of the original 1 corresponds to a predetermined image pattern (called also as an irregularity pattern), and collates the digital data with actually read image data in the transmissive portion. When an image in the transmissive portion of the original 1 is read while the transmissive light sources 21 are turned on, the transmissive portion of the original 1 is read while the reflective light sources 3 housed in the CIS 2 are turned off as described above. Illuminances which are obtained in this way are photoelectrically converted by the light receiving portions 8 to be formed as the image output signal (SIG). The image output signal (SIG) is compared and collated with the image data of the transmissive portion stored in RAM2. If coincidence is attained, a coincidence signal (A) is output to the outside.

Next, the transmissive light source in which the illumination angle is set to 45 degree with respect to the original 1 will be described with reference to FIGS. 8A to 8C. Light which is incident on a transparent film which is completely flat and smooth, such as an OHP sheet generates reflected light and transmitted light at the sheet surface. Usually, reflected light is 10% or less, and transmitted light is 90% or more.

In the case where a transmissive light source is used, usually, a light source is disposed with being opposed to the optical axis of a lens (such as a rod lens array). In Embodiment 1, the light source is disposed with forming an angle of 45 degree with respect to the optical axis of the lens, and hence direct light and reflected light are not incident on the lens. Therefore, the output of a sensor disposed in the opposite direction with respect to the original face side of the lens is substantially zero.

When irregularities are formed on an OHP sheet as shown in FIG. 8B, scattered light is partly generated. The scattered light splits into scattered reflected light and scattered transmitted light. Scattered transmitted light is generated at about 5%.

FIG. 8C shows comparisons of ratios of reflected light, direct transmitted light, and scattered transmitted light with using various materials having transparency. In a transparent film, generation of scattered light is negligible. By contrast, in a white cloudy film, scattered transmitted light which is reflected and refracted by reflection planes in the film is generated. In a translucent watermark portion of a bill, scattered transmitted light is generated in the same manner as irregularities formed in an OHP sheet. This is caused because a watermark portion of a bill or the like has irregularities formed in production of a black watermark or a white watermark.

Figure 9:
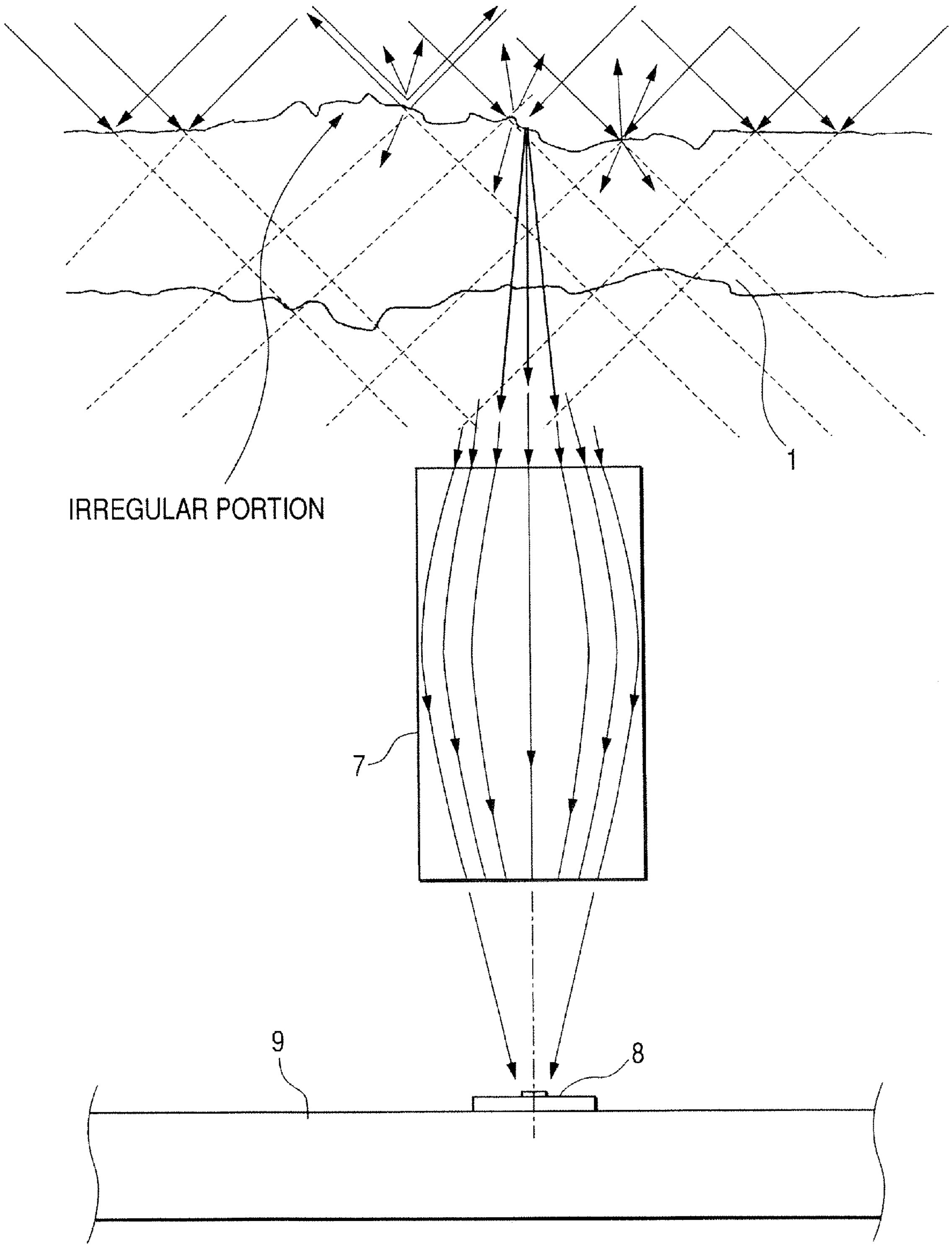

FIG. 9 is an enlarged diagram of a watermark portion of a bill 1. Part of transmitted light which is scattered by an irregularity state of the bill is incident on the light receiving portions 8 via the lens 7.

In the case of the bill 1, in visible and infrared light from the transmissive light sources 21, light passing through the watermark portion is larger in level than light passing through the portion other than the watermark portion. Therefore, a lower limit of the output due to a transmissive portion of the bill 1 is set, and an output which is larger than this set output is taken out as line information of one line. This is illustrated as a waveform chart extracted in FIG. 5A. In this way, an output which is larger than the set output is collated for each line with respect to the presence or absence of a portion similar to the data stored in RAM2. In reading of the CIS 2 having a resolution of 8 dots/mm, for example, average data of 4 consecutive bits is compared with the data stored in RAM2, and a judgment is made in plural places of an envelope shape of digital data. This is sequentially conducted on each line. When the coincidence signal (A) is generated over plural lines, the reading system determines the authenticity of the bill 1.

(Collation)

Next, the collating method will be further described referring to FIGS. 5A and 5B. In the case where the bill (original) 1 having a watermark portion (transmissive portion) is transported in the longitudinal direction, the bill 1 usually has a size of 80 mm or less. When the CIS has the resolution specification of 8 dots/mm, an effective reading region of 640 bits is disposed. The analog image output (SO) is A/D-converted to a digital output. The shading correction and the like are applied to the digital output by the correcting circuit 44, and the resulting digital output is sent as a digital image output from the SIG to the reading system. The output of the correcting circuit 44 is sent also to the collating circuit 45. In the collating circuit 45, a watermark image placed in the watermark portion is compared and collated with the watermark image data stored in RAM2.

FIG. 10A is a digital output diagram in which a digital output obtained by simply averaging image data of the A/D-converted digital image output for each 4 bits is expressed. In the embodiment, the A/D converter 43 having the 8-bit resolution is used. Therefore, the diagram shows 256 digits, and the output is higher as the value is larger. For the sake of convenience, the expression is conducted in bundle every digits. The data of each line (1) supplied to the collating circuit 45 are first calculated and average-processed, and stored in a register (shift register) as shown in FIG. 5B. In Embodiment 1, the register has a bit number of 160 bits. In order to collate an image of the watermark portion, data of digits or less are deleted to erase unwanted data of a portion other than the watermark portion.

Figures 11A, 11B:
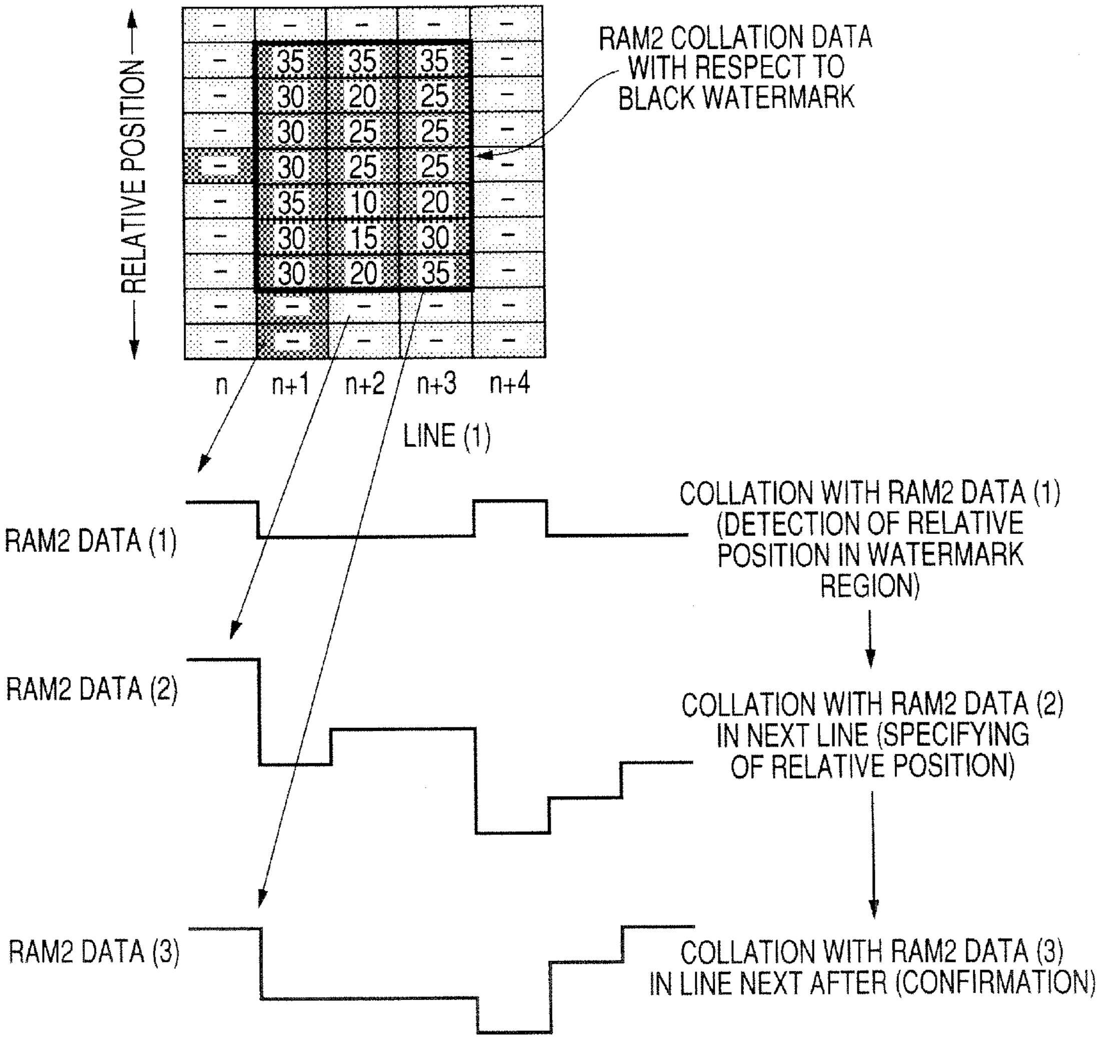
FIGS. 11A and 11B are diagrams showing an image collation data of the image reading apparatus of Embodiment 1 according to the invention.

As shown in FIG. 10B, in order to specify a watermark image of the watermark portion, next, a minimum output of the watermark image is set (in Embodiment 1, the reference output is −30), and this value is added to each output. On the other hand, image data of the black watermark portion shown in FIG. 11A are previously stored in RAM2, and compared with data of the watermark portion which are sent for each line. In the comparison, image data stored in a bidirectional register are bidirectionally transferred, and then compared with data (1) of RAM2 with using the reading period of the next line. The reference output is set to −30 in order to conform the minimum output of the black watermark portion to a value larger than zero, and make adjustment by further increasing the absolute value in the case where the light amount of the transmissive light sources 21 is large as in the case of infrared light, or decreasing the absolute value in the case where the light amount of the transmissive light sources 21 is small as in the case of visible light. Alternatively, the reference output may be obtained by automatically adjusting the light amount of the transmissive light sources 21 with using a monitor light receiving element incorporated in the CIS 2.

Figure 12:
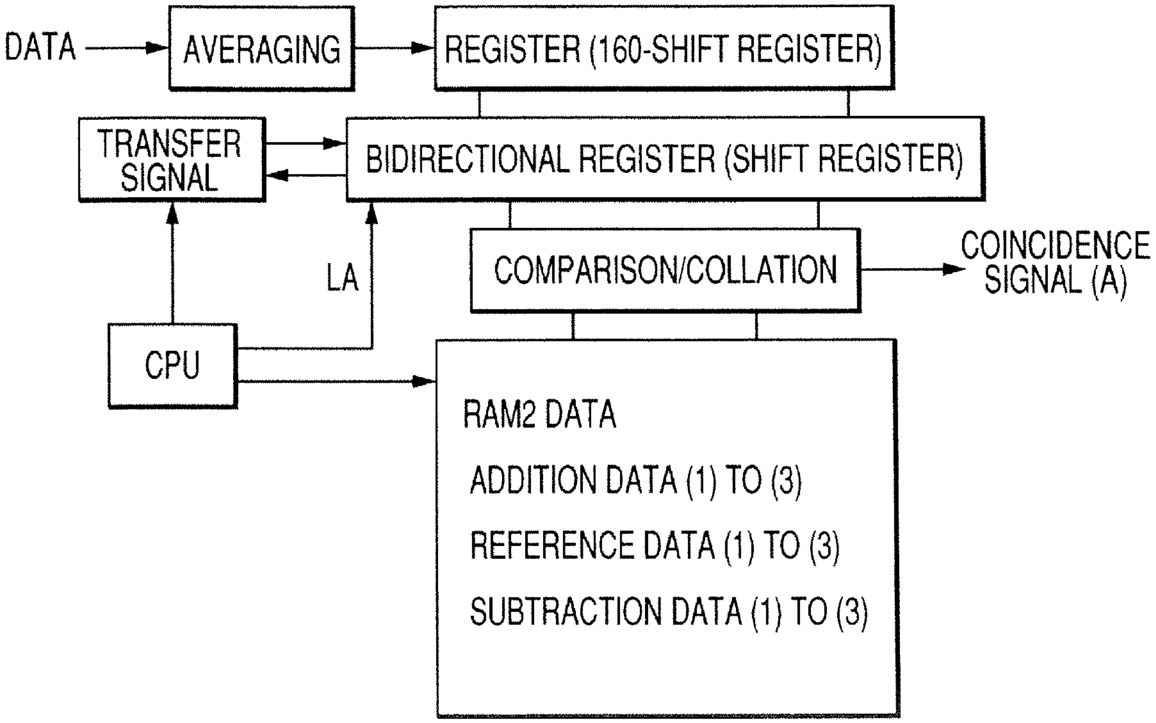
FIG. 12 is a block diagram of the collating circuit of the image reading apparatus of Embodiment 1 according to the invention.

As shown in FIGS. 11B and 12, for each line (1), values which are different respectively by ±5 digits from the reference value of RAM2 are stored into RAM2 data as collation addition and subtraction data. Therefore, accurate collation in which errors less occur is enabled by comparing the values with the digital output value of each image signal (SO).

As shown in FIG. 5B or 12, the pixel position of the CIS 2 is specified by the shift (transfer) number of the bidirectional register having cells of 160 bits or more. In the next line, therefore, data at a specific pixel position are transferred to the shift register, latched (LA), and then compared and collated with RAM2 data (2). At this timing, the coincidence output (A) may be sent out to the reading system. Alternatively, image data of the line after next may be similarly compared and collated with RAM2 data (3), and a coincidence output is obtained, whereby simple collation may be enabled.

In the above, the image output of the image signal (SO) is a 4-bit averaged output. This is employed because an image of a watermark region is deemed as a relatively rough image. Furthermore, the averaged output is employed in view of also contamination of the watermark region. Namely, an image of a watermark region is subjected to the reading judgment of a resolution of 2 bits/mm. When judgment is to be conducted at a higher density, therefore, a CIS having a resolution of 12 dots/mm may be applied so that image reading which is more accurate is enabled. A watermark portion includes a black watermark (a portion in which the thickness is large, and a dense watermark is formed), and a white watermark (a portion in which the thickness is small, and a pale watermark is formed). In Embodiment 1, however, the transmissive light sources 21 are inclined with forming an angle of 45 degree with respect to the optical axis of the rod lens array 7, and hence irregularities in black and water watermark portions are read as image data as described above.

In a region of the light receiving portions 8 where the bill 1 does not exist, the output of the image signal (SO) is substantially zero because the transmissive light sources 21 are inclined. Therefore, such a region is included in a portion other than the watermark region. The inclination angle of the transmissive light sources 21 is set to 45 degree with respect to the optical axis of the rod lens array 7 (a direction perpendicular to the transport direction of the bill 1 or the like). An appropriate range is 45 degree±15 degree. When the inclination angle is equal to or larger than 60 degree, light from the transmissive light sources 21 causes total reflection and divergence, also with respect to scattered light, and hence the reading output is lowered. When the inclination angle is equal to or smaller than 30 degree, direct transmitted light enters the rod lens array 7, and the reading output is increased. Since direct transmitted light is unwanted light, however, the accuracy of authenticity judgment is lowered.

The entire disclosure of Japanese Patent Application No. 2006-009710 filed on Jan. 18, 2006 including specification, claims, drawings and abstract is incorporated herein be reference in its entirety.

What is claimed is:

1. An image reading apparatus comprising:

a transporting unit that transports an irradiated member having a light transmissive portion including irregularities;

a transmissive light source that emits light, which irradiates the irradiated member, the transmissive light source being placed on a first side with respect to the irradiated member and inclined by a predetermined acute angle with respect to a vertical plane that is perpendicular to the irradiated member;

a lens that is placed on a second side with respect to the irradiated member opposing the first side, and converges scattered light from the transmissive light source that is scattered by the irregularities; and a sensor that receives the scattered light converged by the lens.

2. The image reading apparatus according to claim 1, wherein the predetermined acute angle is within a range from 30 degree to 60 degree.

3. The image reading apparatus according to claim 1, wherein:

the lens is a rod lens array and an optical axis of the rod lens array is perpendicular to the irradiated member;

the irregularities of the light transmissive portion include black watermark portions and white watermark portions, and the rod lens array converges the scattered light from the transmissive light source that is scattered by the irregularities in the black and white watermark portions; and an image output signal obtained from an output of the sensor is compared with a stored image data of the black watermark portion.

4. An image reading apparatus comprising:

a transporting unit that transports an irradiated member having a light transmissive portion including irregularities;

a transmissive light source that emits light, the transmissive light source being placed on a first face side with respect to the irradiated member and inclined by a predetermined acute angle with respect to a vertical plane that is perpendicular to the irradiated member;

a light-guiding member that guides the light emitted from the transmissive light source to the irradiated member to irradiate the irradiated member;

a lens that is placed on a second face side with respect to the irradiated member opposing the first side, and converges scattered light from the light-guiding member that is scattered by the irregularities; and a sensor that receives the scattered light converged by the lens.

5. The image reading apparatus according to claim 4, wherein:

the lens is a rod lens array and an optical axis of the rod lens array is perpendicular to the irradiated member;

the irregularities of the light transmissive portion include black watermark portions and white watermark portions, and the rod lens array converges the scattered light from the light-guiding member that is scattered by the irregularities in the black and white watermark portions; and an image output signal obtained from an output of the sensor is compared with a stored image data of the black watermark portion.

6. An image reading apparatus comprising:

a transporting unit that transports an irradiated member to a transport direction, the irradiated member having a light transmissive portion including irregularities and a light reflective portion;

first and second transmissive light sources that emit lights, which irradiate the irradiated member, the first and the second transmissive light source being placed on a first side with respect to the irradiated member and inclined respectively in the transport direction and in an opposite transport direction that is opposite to the transport direction by a predetermined acute angle with respect to a vertical plane that is perpendicular to the irradiated member;

a lens that is placed on a second side with respect to the irradiated member opposing the first side, and converges scattered light from the first and second transmissive light sources that is scattered by the irregularities;

a sensor that receives the scattered light converged by the lens;

third and fourth reflective light sources that are placed on the second side with respect to the irradiated member upstream to the transport direction and downstream to the transport direction with respect to the sensor respectively; and light-guiding members that guide lights emitted from the third and fourth reflective light sources to irradiate the irradiated member to reflect light from the light-guiding members to the lens which converges the reflected light to the sensor.

7. The image reading apparatus according to claim 6, wherein:

the lens is a rod lens array and an optical axis of the rod lens array is perpendicular to the irradiated member;

the irregularities of the light transmissive portion include black watermark portions and white watermark portions, and the rod lens array converges the scattered light from the first and second transmissive light sources that is scattered by the irregularities in the black and white watermark portions; and an image output signal obtained from an output of the sensor is compared with a stored image data of the black watermark portion.

8. An image reading apparatus comprising:

a transporting unit that transports an irradiated member to a transport direction, the irradiated member having a light transmissive portion including irregularities;

a transmissive light source that emits light, which irradiates the irradiated member, the transmissive light source being placed on a first side with respect to the irradiated member and inclined by a predetermined acute angle with respect to a vertical plane that is perpendicular to the irradiated member;

a lens that is placed on a second side with respect to the irradiated member opposing the first side, and converges scattered light from the transmissive light source that is scattered by the irregularities;

a sensor that receives the scattered light converged by the lens to output an electric signal;

an A/D converter that converts the output signal of the sensor to digital data;

a storage unit that stores reference digital data obtained from a reference irradiated member; and a collating unit that compares the digital data from the A/D converter with the reference digital data stored in the storage unit.

9. The image reading apparatus according to claim 8, wherein the storage unit stores the digital data from the A/D converter at regular intervals in the transport direction of the irradiated member and a main scanning direction of the irradiated member respectively.

10. The image reading apparatus according to claim 8, wherein the collating unit adds a predetermined value to the digital data from the A/D converter and compares a result of the addition with the reference digital data stored in the storage unit.

11. The image reading apparatus according to claim 8, wherein the collating unit subtracts a predetermined value from the digital data from the A/D converter and compares a result of the subtraction with the reference digital data stored in the storage unit.

12. The image reading apparatus according to claim 8, wherein:

the lens is a rod lens array and an optical axis of the rod lens array is perpendicular to the irradiated member;

the irregularities of the light transmissive portion include black watermark portions and white watermark portions, and the rod lens array converges the scattered light from the transmissive light source that is scattered by the irregularities in the black and white watermark portions; and the digital data converted from the output signal of the sensor is compared with the stored reference digital data of the black watermark portion.

* * * * *